(12) United States Patent
Momose et al.

(10) Patent No.: US 9,340,117 B2
(45) Date of Patent: May 17, 2016

(54) POWER SUPPLY AND DEMAND LEVELING SYSTEM

(75) Inventors: Nobuo Momose, Aichi-pref. (JP);
Makoto Kataniwa, Chiba (JP);
Yasuhiro Nakai, Bangkok (TH);
Hiroyuki Kumazawa, Hyogo (JP);
Tatsuji Munaka, Kanagawa (JP);
Yoshitaka Okazaki, Hyogo-Pref (JP);
Yuichiro Shimura, Tokyo (JP); Hiroshi Tanaka, Kanagawa-Pref. (JP); Hiroshi Irie, Tokyo (JP); Hitoshi Maejima, Saitama-Pref. (JP)

(73) Assignees: MITSUBISHI JIDOSHA KOGYO KABUSHIKI KAISHA, Tokyo (JP);
MITSUBISHI CORPORATION, Tokyo (JP); MITSUBISHI DENKI KABUSHIKI KAISHA, Tokyo (JP);
MITSUBISHI RESEARCH INSTITUTE, INC., Tokyo (JP)

( * ) Notice: Subject to any disclaimer, the term of this patent is extended or adjusted under 35 U.S.C. 154(b) by 457 days.

(21) Appl. No.: 13/814,154

(22) PCT Filed: Jul. 29, 2011

(86) PCT No.: PCT/JP2011/067416
§ 371 (c)(1),
(2), (4) Date: Mar. 20, 2013

(87) PCT Pub. No.: WO2012/017937
PCT Pub. Date: Feb. 9, 2012

(65) Prior Publication Data
US 2013/0184882 A1    Jul. 18, 2013

(30) Foreign Application Priority Data
Aug. 5, 2010   (JP) ................... 2010-176162

(51) Int. Cl.
*G06F 19/00*   (2011.01)
*B60L 11/18*   (2006.01)
*H02J 3/32*    (2006.01)

(52) U.S. Cl.
CPC .......... *B60L11/1842* (2013.01); *B60L 11/1844* (2013.01); *B60L 11/1846* (2013.01); *B60L 11/1877* (2013.01); *H02J 3/32* (2013.01); *B60L 2210/30* (2013.01); *B60L 2230/22* (2013.01); *B60L 2230/24* (2013.01); *B60L 2230/40* (2013.01); *B60L 2240/545* (2013.01); *B60L 2240/70* (2013.01); *B60L 2250/16* (2013.01); *Y02E 60/721* (2013.01); *Y02T 10/705* (2013.01); *Y02T 10/7005* (2013.01); *Y02T 10/7088* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01) *B60L 11/1838* (2013.01); *B60L 11/1816* (2013.01); *B60L 11/1824* (2013.01);

(Continued)

(58) Field of Classification Search
CPC ... Y02T 90/14; Y02T 10/7088; Y02T 90/128; Y02T 90/163; Y02T 90/168; Y02T 90/12; B60L 11/1838; B60L 11/1824; B60L 11/1846
USPC .......................................... 700/286
See application file for complete search history.

(56) References Cited

U.S. PATENT DOCUMENTS

| | | | |
|---|---|---|---|
| 2005/0228553 A1* | 10/2005 | Tryon | 701/22 |
| 2008/0039979 A1* | 2/2008 | Bridges et al. | 700/292 |
| 2008/0039980 A1* | 2/2008 | Pollack et al. | 700/295 |
| 2008/0039989 A1* | 2/2008 | Pollack et al. | 701/22 |
| 2008/0040223 A1* | 2/2008 | Bridges et al. | 705/14 |
| 2008/0040263 A1* | 2/2008 | Pollack et al. | 705/39 |
| 2008/0040295 A1* | 2/2008 | Kaplan et al. | 705/412 |
| 2008/0040296 A1* | 2/2008 | Bridges et al. | 705/412 |
| 2008/0040479 A1* | 2/2008 | Bridge et al. | 709/224 |

| | | | | |
|---|---|---|---|---|
| 2008/0052145 | A1* | 2/2008 | Kaplan et al. | 705/8 |
| 2008/0281663 | A1* | 11/2008 | Hakim et al. | 705/8 |
| 2009/0043519 | A1* | 2/2009 | Bridges et al. | 702/62 |
| 2009/0043520 | A1* | 2/2009 | Pollack et al. | 702/62 |
| 2009/0222143 | A1* | 9/2009 | Kempton | 700/291 |
| 2010/0094496 | A1* | 4/2010 | Hershkovitz et al. | 701/22 |
| 2010/0280678 | A1* | 11/2010 | Tate et al. | 700/297 |
| 2011/0196692 | A1* | 8/2011 | Chavez et al. | 705/1.1 |
| 2011/0202221 | A1* | 8/2011 | Sobue et al. | 701/22 |
| 2012/0056585 | A1* | 3/2012 | Mariels | 320/116 |

FOREIGN PATENT DOCUMENTS

| | | |
|---|---|---|
| JP | 2007-282383 A | 10/2007 |
| JP | 2009-183086 A | 8/2009 |
| WO | WO 2008/073453 A1 | 6/2008 |
| WO | WO 2008/141246 A2 | 11/2008 |

OTHER PUBLICATIONS

Einhorn, Markus, Werner Roessler, and Juergen Fleig. "Improved performance of serially connected li-ion batteries with active cell balancing in electric vehicles." Vehicular Technology, IEEE Transactions on 60.6 (2011): 2448-2457.*

Brandi, M., et al. "Batteries and battery management systems for electric vehicles." Proceedings of the Conference on Design, Automation and Test in Europe. EDA Consortium, 2012.*

* cited by examiner

*Primary Examiner* — Michael D Masinick

(74) *Attorney, Agent, or Firm* — Birch, Stewart, Kolasch & Birch, LLP

(57) ABSTRACT

The invention judges a total power supply/demand condition of the electricity consumers 2 as a whole according to an individual power supply/demand condition of electricity consumers 2, judges a total usable capacity of all batteries 17 according to a usable capacity of the batteries 17 of electric vehicles 10 parked at electricity consumers 2, obtains required charge/discharge amounts of all the batteries 17 according to a result of comparison of the total power supply/demand condition of the electricity consumers 2 as a whole with the total usable capacity of all the batteries 17, subjects the batteries 17 to charge/discharge controls according to the required charge/discharge amounts, the power supply/demand conditions of the electricity consumers 2, and the usable capacities of the batteries.

5 Claims, 4 Drawing Sheets

POWER SUPPLY AND DEMAND LEVELING SYSTEM

TECHNICAL FIELD

The present invention relates to a power supply and demand leveling system, which supplies electricity from electricity utilities such as electric power companies to electricity consumers, including factories, business institutions and homes, through distribution lines, and levels power supply and demand by controlling the charge/discharge of batteries of electric vehicles parked at the electricity consumers according to a charge/discharge command that is outputted from a power supply/demand management center on the basis of power supply/demand information transmitted from the electricity utilities. In this specification, the electricity utilities mean not only electric power companies serving as utilities but also grid operators, such as ISO (independent system operator), TSO (transmission system operator), and IESO (independent electricity system operator).

BACKGROUND ART

This type of systems for leveling power supply and demand include a system using stationary batteries set in electricity consumers. This system charges the batteries during night when electricity demand is relatively low, and discharges the batteries during daytime when electricity demand is at its peak, thus leveling power supply and demand. Such a power supply and demand leveling system, which uses the stationary batteries, however, requires a large-scale installation. This makes it difficult to employ the system at low cost. To solve this problem, it has lately been suggested to utilize a power supply and demand leveling system, which uses batteries installed in electric vehicles or hybrid electric vehicles (hereinafter, collectively referred to as electric vehicles) instead of using stationary batteries (see Patent Document 1, for example).

The power supply and demand leveling system, which is disclosed in the Patent Document 1, was made in light of the fact that an electric vehicle used for commuting to and from a business institution who is an electricity consumer remains parked during daytime when electricity demand is at its peak, and thus that there is a battery capacity available for use. During peak hours of electricity demand, the system emits electricity that is stored in the batteries of electric vehicles to make up for electricity shortage in business institutions. During off-peak hours, the system charges the batteries with off-peak electricity to prepare for the next peak hours. By so doing, the system levels the supply and demand of electricity and thus decreases the usage of contracted electricity supplied from the business institutions, thereby reducing electricity costs.

PRIOR ART DOCUMENT

Patent Document

[Patent Document 1] Unexamined Japanese Patent Publication (Kokai) No. 2007-282383

SUMMARY OF THE INVENTION

Problems to be solved by the Invention

The power supply and demand leveling system, which is disclosed in Patent Document 1, however, is designed to level power supply and demand in business institutions, as is apparent from the description referring to the decrease of contracted electricity. In other words, the technology disclosed in Patent Document 1 differs from the concept of a so-called smart grid that regards electricity consumers as grid cells and is aimed at leveling power supply and demand in the entire power network constructed of these grid cells.

The smart grid enables electricity to be bi-directionally transmitted between electricity utilities and consumers. When there is a supply-demand gap in an electricity consumer, the electricity resulted from the imbalance, that is, for example, excess electricity, is supplied through the electricity utilities to other electricity consumers. This prevents a demand imbalance among the electricity consumers and also prevents a fluctuation in supply of the electricity utilities as a whole. As a consequence, the equilibration of power supply and demand in the entire smart grid is achieved. Even if the battery capacity of the electric vehicle parked at an electricity consumer is used, the battery capacity should be used for adjusting the electricity supply not only to this particular consumer but also to other consumers. According to the technology disclosed in Patent Document 1, however, the battery capacity is used exclusively by the former, so that it is hard to say that the battery capacities of the electric vehicles are profitably utilized.

The present invention has been made to solve the foregoing problems. An object of the invention is to provide a power supply and demand leveling system, in which the battery capacity of an electric vehicle is not only used by each electricity consumer but also profitably utilized to level power supply and demand in the entire smart grid.

Means for Solving the Problems

In order to accomplish the object, the present invention includes a plurality of electricity consumers supplied with electricity from electricity utilities through distribution lines, and whose electric vehicles are arbitrarily parked and connected to the distribution lines; a power supply/demand condition judging device into which power supply/demand conditions of the electricity consumers are individually entered, and which judges from the entered information a total power supply/demand condition of the electricity consumers as a whole; a battery capacity judging device into which capacities of batteries installed in the electric vehicles being parked, which will be usable after the batteries are charged/discharged, are individually entered from the electricity consumers, and which judges a total usable capacity from the entered information; a charge/discharge command setting device into which an individual power supply/demand condition of the electricity consumers and a total power supply/demand condition of the electricity consumers as a whole are entered from the power supply/demand condition judging device, into which an individual usable capacity of the batteries and a total usable capacity of all the batteries are entered from the battery capacity judging device, sets charge/discharge commands required to prevent a fluctuation in power supply and demand of the electricity consumers as a whole and an imbalance of power supply and demand between the electricity consumers and level power supply and demand, with respect to the batteries of the electric vehicles on the basis of the above information, and outputs the preset charge/discharge commands to the respective electricity consumers; and a charge/discharge controller that is provided to each of the electricity consumers and implements charge/discharge controls on the batteries according to the respective charge/discharge commands entered from the charge/discharge command setting device.

Preferably, the electricity consumers have an input device for entering a plurality of clock times after the electric vehicles are connected to the distribution lines, and also entering as a usable capacity a capacity allowing charge and discharge for equilibration of power supply and demand among the capacities of the batteries installed in the electric vehicles at each of the clock times, on the basis of drive schedules of the parked electric vehicles. The usable capacity entered by means of the input device is outputted to the battery capacity judging device, and the battery capacity judging device judges a total usable capacity of all the batteries on the basis of the usable capacities entered from the electricity consumers.

Preferably, the battery capacity judging device receives the usable capacities of the batteries individually not only from the electric vehicles parked at the electricity consumers but also from moving electric vehicles, and also receives estimated arrival times to the electricity consumers, namely, destinations, individually. On the premise that the usable capacities of batteries of the electric vehicles are secured at the electric consumers at the estimated arrival times of the moving electric vehicles to the electricity consumers, a charge/discharge command setting device sets a present charge/discharge command of each battery.

Advantageous Effects of the Invention

According to the power supply and demand leveling system, on the basis of the individual power supply/demand condition of the electricity consumers, the total power supply/demand condition of the electricity consumers as a whole, the individual usable capacity of the batteries installed in the electric vehicles parked at the electricity consumers, and the total usable capacity of all the batteries, the charge/discharge command is set with respect to each battery of each of the electric vehicles. According to the charge/discharge commands, the batteries are subjected to the respective charge/discharge controls. As described, the charge/discharge command of each battery is set according to information about each of the electricity consumers (power supply/demand conditions and usable capacities) and collective information about all the electricity consumers (total power supply/demand condition and total usable capacity). It is then possible to use the battery capacity of the electric vehicle not only by each of the electric consumers but also by the other electricity consumers. Consequently, the battery capacities of the electric vehicles can be profitably utilized for equilibration of power supply and demand in the entire smart grid.

On the basis of the drive schedules of the electric vehicles of the electricity consumers, the clock times after the batteries become available for equilibration of power supply and demand due to connection of the electric vehicles to the distribution lines and the usable capacity of each battery for each of the clock times are entered into the input device. On the basis of the entered usable capacity of each battery for each of the clock times, the total usable capacity of all the batteries is judged. The batteries can be thus subjected to the charge/discharge controls within ranges of the respective usable capacities. This makes it possible to profitably use the battery capacities to the full for equilibration of power supply and demand.

It is further possible to expect that the usable capacity of the battery of the electric vehicle can be secured at the electricity consumer at the estimated arrival time of the moving electric vehicle to the electricity consumer. The present charge/discharge commands of the batteries can be set on the above premise, so that the charge/discharge control on each battery can be more properly conducted to level the power supply and demand.

MODE FOR CARRYING OUT THE INVENTION

[First Embodiment]

A first embodiment of a power supply and demand leveling system, in which the present invention is embodied, will be described below.

Figure 1:
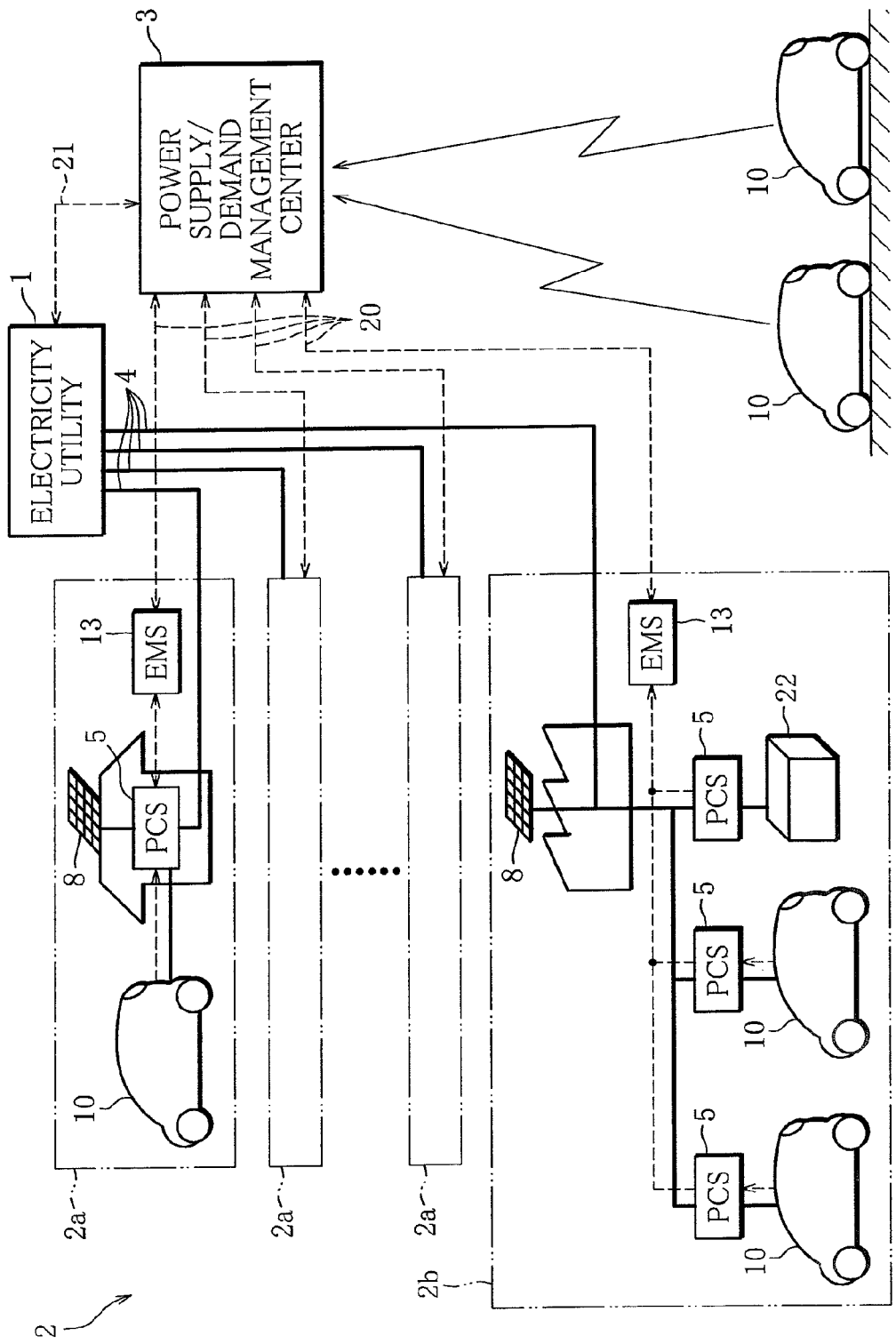
FIG. 1 is a view of the entire configuration of a power supply and demand leveling system according to an embodiment.

FIG. 1 is a view of the entire configuration of the power supply and demand leveling system according to the present embodiment.

The power supply and demand leveling system (corresponding to a so-called smart grid) is formed of an electricity utility 1 such as an electric power company, a plurality of electricity consumers 2 including homes 2a or factories and business institutions 2b (constituting a smart grid), and a power supply/demand management center 3 that regulates and levels power supply and demand in the smart grid.

Each electricity consumer 2 is connected through a distribution line 4 to the electricity utility 1. The electricity generated at a power plant, not shown, is supplied from the electricity utility 1 through distribution lines 4 to the electricity consumers 2. If one of the electricity consumers 2 has power-generating equipment, such as a solar panel and a wind generator, and there generates excess electricity that is produced by the power-generating equipment and is not used by the electricity consumer 2, the excess electricity is supplied from the distribution lines 4 through the electricity utility 1 to other electricity consumers 2.

Figure 2:
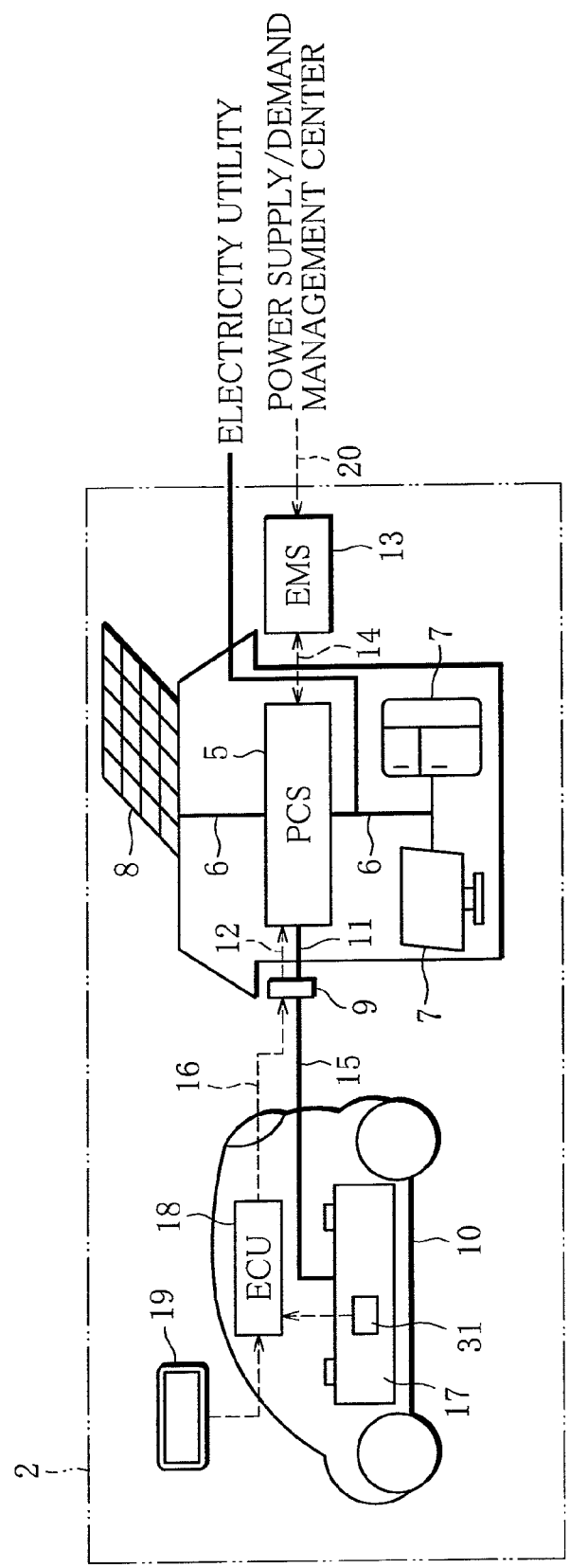
FIG. 2 is a detail view showing a standard home as an example of an electricity consumer.

FIG. 2 is a detail view showing a standard home 2a as an example of an electricity consumer. In this case, electricity from the electricity utility 1 is supplied through power lines 6 in the home to a power controller 5 (hereinafter, referred to as PCS) serving as an AC-DC converter and to electricity loads 7, such as a TV and a refrigerator, which are situated in the home.

In this example, a solar panel 8 is set on the roof. The electricity generated by the solar panel 8 is secondarily used by being supplied through the PCS 5 to the electricity load 7.

A connection port 9 is provided in a predetermined position of the electricity consumer 2, for example, in an exterior wall of a house in the case of the home 2a. The connection port is used to input and output power for battery charge between the electricity consumer 2 and an electric vehicle 10 parked at the electricity consumer 2 and also used to input and output the battery information described later.

More specifically, the PCS 5 of the home is connected to the connection port 9 through a power line 11 and a signal line 12, and is also connected through the signal line 14 to an energy management system 13 (hereinafter, referred to as EMS) that regulates the power supply and demand within the home.

The connection port 9 is arbitrarily connected with a power line 15 and a signal line 16 (actually combined into a single wire outside the vehicle) both extending from the electric vehicle 10. In the inside of the vehicle, the power line 15 is connected to a battery 17, and the signal line 16 is connected to an ECU 18 (electronic control unit) that conducts, in an integrated way, motor control for moving the vehicle, the management of remaining capacity of the battery 17 during the drive of the vehicle, air-conditioner control, the control of a navigator placed in a driver's seat, etc.

As described later, the battery 17 of the electric vehicle 10 is used for equilibration of power supply and demand in the smart grid. For that reason, even if battery charge is not necessary, it is recommended that the battery 17 be immediately connected to the connection port 9 after the vehicle 10 returns home or arrives at a factory or business institution.

Although not shown, the ECU 18 is formed of an input/output device, a memory unit (ROM, RAM or the like) used to store a control program, a control map, etc., a central processing unit (CPU), a timer, and the like. An input side of the ECU 18 is connected with a touch-screen display 19 of the navigator, so that a driver can arbitrarily enter information into the ECU 18 with the display 19.

The EMS 13 of the electricity consumer 2 is connected to the power supply/demand management center 3 through a signal line 20 such as a telephone line. The EMS 13 enters battery information from the ECU 18 of the electric vehicle 10 through the connection port 9 and the PCS 5. On the basis of the battery information, a capacity usable (usable capacity) for equilibration of power supply and demand within the smart grid is calculated and outputted to the power supply/demand management center 3 through the signal line 20. In light of the fact that it is necessary to prepare for the start of use of the electric vehicle 10, the present embodiment regards a value obtained by subtracting a capacity necessary for the drive of the electric vehicle 10 (corresponding to C2 of a second embodiment described later) from the entire capacity of the battery 17 as the usable capacity, and outputs this value to the power supply/demand management center 3.

However, the usable capacity of the battery 17 is not limited to the foregoing. For example, the remaining capacity of the battery 17 of the electric vehicle 10 immediately after the electric vehicle 10 arrives at the electricity consumer 2 greatly depends upon the condition of drive to the electricity consumer 2. If the remaining capacity is drastically decreased to be lower than a lower limit of a usable area, it is required to immediately charge the battery 17 to prepare the subsequent drive. In this case, the battery 17 should be limited to be used in a charge side until charge is completed (until the battery 17 reaches a capacity required for the drive) unlike the case of the ordinary battery 17, in which the battery can be used in both a discharge side (compensation for deficiency of power supply and demand) and the charge side (consumption of excess of power supply and demand) within a usable area. The electric vehicle 10 in which the remaining capacity of the battery 17 is decreased may use the battery capacity only for charge, regardless of the usable capacity until the charge is completed.

Based upon an operation condition of the PCS 5, the EMS 13 judges the power supply/demand condition in which electricity is supplied from the electricity utility 1 to the electricity consumer 2, and outputs the judgment result to the power supply/demand management center 3 through the signal line 20.

As shown in FIG. 1, the case in which the electricity consumer 2 is a factory or a business institution does not greatly differ from the case in which the consumer 2 is home. Only differences are that the electricity consumer 2 in the former case has more electric vehicles 10 and is provided with a reusable battery 22 in addition to the battery 17 of the electric vehicle 10.

Due to the above-described configuration, the power supply/demand management center 3 can determine whether or not the electric vehicle 10 parked at the electricity consumer 2 is present, and if there is any parked vehicle, the power supply/demand management center 3 finds the usable capacity of the battery 17. The power supply/demand management center 3 also can assess the power supply/demand condition of the electricity consumer 2. Based upon the foregoing input information, the power supply/demand management center 3 outputs a charge/discharge command to the EMS 13 of the electricity consumer 2 to prevent a fluctuation in power supply and demand of the electricity consumers 2 as a whole (in the smart grid) and an imbalance of power supply and demand between the electricity consumers 2. According to the charge/discharge command, the EMS 13 of the electricity consumers 2 activates the PCS 5 as an AC-DC converter, and controls the charge and discharge of the batteries 17 of the parked electricity vehicles 10, thus achieving the equilibration of power supply and demand (charge/discharge controller).

Figure 3:
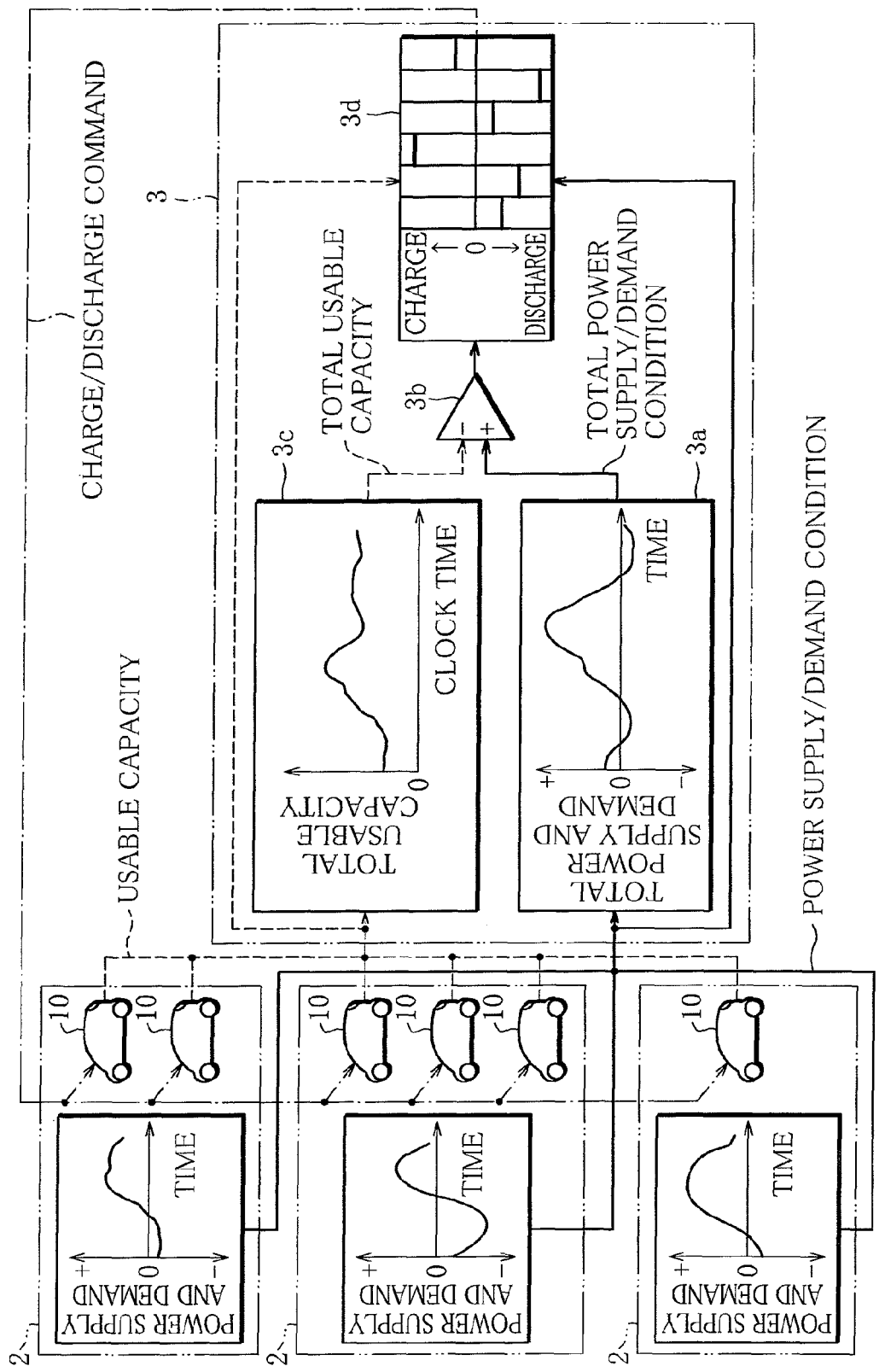
FIG. 3 is a conceptual diagram showing a procedure for setting a charge/discharge command with respect to each battery according to a power supply/demand condition of each electricity consumer and a usable capacity of the battery of each electric vehicle.

A procedure for setting the charge/discharge command with respect to each battery according to the power supply/demand condition of the electricity consumer 2 and the usable capacity of the battery 17 of the electric vehicle 10 will be explained below with reference to a diagram shown in FIG. 3.

The electricity consumer 2 uses the EMS 13 to sequentially judge, in chronological order, the power supply/demand condition based upon the excess or deficiency of electricity. The power supply/demand condition is entered into a power supply/demand condition judging section 3a of the power supply/demand management center 3. The power supply/demand condition judging section 3a calculates a total power supply/demand condition of all the electricity consumers 2 as the total of the entered individual power supply/demand condition of the electricity consumers 2 (power supply/demand condition judging device). The total power supply/demand condition is entered into a comparing section 3b. The total power supply/demand condition fluctuates in chronological order due to fluctuations in the individual power supply/demand condition, and the fluctuation leads to a deficiency and excess of power supply and demand.

The usable capacity of the battery 17 of the electricity vehicle 10 parked at the electricity consumer 2 is sequentially judged by the EMS 13. The usable capacity is entered into a battery capacity judging section 3c of the power supply/demand management center 3. The battery capacity judging section 3c calculates the total usable capacity of all the batteries 17 as the total of the entered usable capacities of the batteries 17 (battery capacity judging device). The total usable capacity is entered into the comparing section 3b.

The usable capacity obtained by subtracting the capacity required for drive from the total capacity is a constant value based upon the specifications of the battery 17. Since the total number of the electric vehicles 10 parked at the electricity consumers 2 fluctuates, the total usable capacity fluctuates in chronological order.

The comparing section 3b sequentially compares the total power supply/demand condition of all the electricity consumers 2 with the total usable capacity of all the batteries, which have been entered into the comparing section 3b. A result of the comparison is entered into a charge/discharge command setting section 3d.

The total power supply and command condition shows the excess and deficiency of the power supply and demand of all the electricity consumers 2 in chronological order. Likewise, the total usable capacity shows the total usable capacity of all the batteries 17 in chronological order to prevent the excess and deficiency of power supply and demand.

At that point, if the electricity supply is deficient, the deficiency of electricity is compensated by discharging the batteries 17. If the electricity supply is excess, the excess electricity is stored by charging the batteries 17. Fluctuations in power supply and demand in the electricity consumers 2 are prevented by comparing the total power supply/demand condition of all the electricity consumers 2 with the total usable capacity of all the batteries 17. It is then possible to estimate how much charge/discharge amounts of the batteries 17 are required in totality. For example, required charge/discharge amounts of all the batteries 17, which are set in light of the foregoing, are entered into the charge/discharge command setting section 3d as the result of comparison.

Needless to say, if the excess and deficiency of power supply and demand are higher than the total usable capacity of the batteries 17, the required charge/discharge amounts of all the batteries 17 corresponding to the total usable capacity are set.

In addition to the required charge/discharge amounts of all the batteries 17, which are entered into the charge/discharge command setting section 3d as a result of comparison by the comparing section 3b, the individual power supply/demand condition of the electricity consumers 2 and the usable capacity of each battery 17 are also entered into the charge/discharge command setting section 3d. The charge/discharge command setting section 3d sets a charge/discharge command with respect to each of the batteries 17 so that the following requirements are satisfied (charge/discharge command setting device).

1. To prevent chronological fluctuations in power supply and demand of the electricity consumers 2 as a whole.
2. To prevent an imbalance of power supply and demand between the electricity consumers 2.
3. To reduce the charge/discharge loads of the batteries 17 within the individual usable capacity as much as possible to prevent deterioration after the above requirements 1 and 2 are satisfied.

The requirement 1 is satisfied if the battery 17 of the electric vehicle 10 parked at the electricity consumer 2 is subjected to the charge/discharge control so as to meet the required charge/discharge amount of the battery 17. To meet the requirements 2 and 3, it is necessary to assess the individual power supply and demand condition of the electricity consumers 2, and to obtain the usable capacity of the battery 17. The above information is also entered into the charge/discharge command setting section 3d.

In fact, various assessment functions are previously set according to the requirements 1 to 3. The charge/discharge command setting section 3d sets an optimum charge/discharge amount of the battery 17 as a charge/discharge command according to the assessment functions. The charge/discharge command thus set is outputted from the charge/discharge command setting section 3d to the electricity consumer 2. The battery 17 of the electric vehicle 10 parked at the electricity consumer 2 is subjected to the charge/discharge control by the EMS 13.

Due to the charge/discharge controls on the batteries 17, for example, if the electricity supply of the electricity consumers 2 as a whole is deficient, the deficiency of electricity is compensated by discharging the batteries 17. If the electricity supply is excess, the excess electricity is stored by charging the batteries 17. This prevents chronological fluctuations in power supply and demand of the electricity consumers 2 as a whole.

If there is a voltage differential caused by the imbalance of power supply and demand between the electricity consumers 2, the battery 17 of the electric vehicle 10 parked at the electricity consumer 2 whose voltage tends to increase is prevented from being discharged (or is encouraged to be charged), and the battery 17 of the electric vehicle 10 parked at the electric consumer 2 whose voltage tends to decrease is encouraged to be discharged (or is prevented from being charged). This way, the imbalance of the power supply and demand is prevented. If an electricity balance in each of the electricity consumers 2 is not achieved simply by the charge/discharge control of the battery 17, the excess electricity is supplied from the electricity consumer 2 whose voltage tends to increase through the electricity utility 1 to the electricity consumer 2 whose voltage tends to decrease. As a consequence, the imbalance of the power supply and demand is prevented.

The usable capacity is changed by the specifications of the battery 17 of the electric vehicle 10. On this account, when a required charge amount of all the batteries 17 is allocated to each of the batteries 17, the higher the usable capacity of the battery 17 is, the larger the charge/discharge amount is set as the charge/discharge command. This equalizes the charge/discharge loads of the batteries 17.

As described above, the power supply and demand leveling system according to the present embodiment judges the total power supply and command condition of the electricity consumers 2 as a whole on the basis of the individual power supply/demand condition of the electricity consumers 2, and judges the total usable capacity of all the batteries 17 on the basis of the individual usable capacity of the batteries 17. Based upon the total power supply/demand condition of the electricity consumers 2 as a whole and the total usable capacity of all the batteries 17, the system obtains the required charge/discharge amounts of all the batteries 17, which are necessary to prevent the fluctuation of power supply and demand of the electricity consumers 2 as a whole. Based upon the required charge/discharge amounts, the individual power supply/demand condition of the electricity consumers 2, and the individual usable capacity of the batteries 17, the system sets the charge/discharge command with respect to each battery 17, thereby conducting the charge/discharge control of the batteries 17.

It is therefore possible to set the charge/discharge commands for the batteries 17 according to the required charge/discharge amounts of all the batteries 17 so that the chronological fluctuations of power supply and demand of the electricity consumers 2 as a whole may be regulated. Moreover, based upon the individual power supply/demand condition of the electricity consumers 2 and the usable capacities of the batteries 17, the charge/discharge command of each of the batteries 17 can be set so that the imbalance of power supply and demand between the electricity consumers 2 may be prevented or that the charge/discharge loads of the batteries 17 may be reduced as much as possible.

In other words, based upon the information of each of the electricity consumers 2 (power supply/demand conditions and usable capacities) and the information of the electricity consumers 2 as a whole (total power supply/demand condition and total usable capacity), the charge/discharge command for each of the batteries 17 is set. It is therefore possible to not only use the battery capacity of the electric vehicle 10 at the individual electricity consumer 2 as in the technology disclosed in the Patent Document 1 but also use the battery capacities of the electric vehicles 10 among the other electricity consumers 2. Consequently, the battery capacities of the electric vehicles 10 can be profitably used for equilibration of power supply and demand in the entire smart grid.

[Second Embodiment]

A second embodiment will be described below, in which the present invention is embodied in the form of another power supply and demand leveling system.

The power supply and demand leveling system according to the second embodiment is identical to the first in its basic configuration, and a difference lies in the setting of the usable capacity of the battery 17. Since the first embodiment constantly secures the battery capacity required for the drive of the electric vehicle 10 and uses the excess capacity as the usable capacity, the first embodiment cannot offer much battery capacity that can be used for equilibration of power supply and demand. To solve this, based upon drive schedules of the electric vehicle 10 parked at the electricity consumer 2, the second embodiment make the driver previously enter how much capacity of the entire capacity of the battery 17 of the electric vehicle 10 may be used for equilibration of electricity demand, as a usable capacity for each given clock time, thus increasing the usable capacity. The following description will focus on the above-mentioned procedure.

Figure 4:
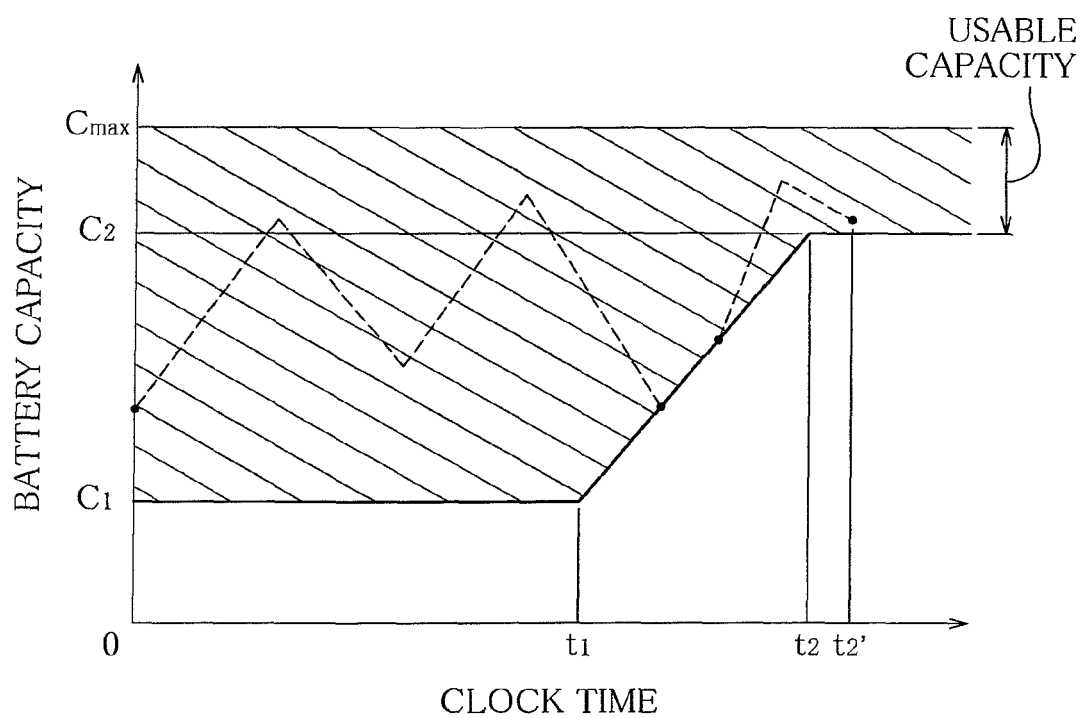
FIG. 4 is a graph showing an example of input of the usable capacity of the battery for each clock time in a second embodiment.

FIG. 4 is a graph showing an example of input of the usable capacity of the battery 17 with respect to the electric vehicle 10 parked at the electricity consumer 2 for each clock time. A vertical axis in FIG. 4 shows the battery capacity in proportion to an entire capacity Cmax. A horizontal axis in FIG. 4 shows a clock time counted from a time point when the electric vehicle 10 is connected to the connection port 9 of the electricity consumer 2.

The input of the usable capacity of the battery 17 with respect to each clock time is conducted using as an index a required capacity (entire capacity Cmax-usable capacity) that is a battery capacity to be secured. In the example of the input shown in FIG. 4, the electric vehicle 10 is scheduled to be used not at or before clock time t1 but at clock time t2. The example shows that there is the possibility that the start of using the electric vehicle 10 will be hastened within a time period between the clock time t1 and the clock time t2 due to schedule change.

For that reason, during a time period before clock time t1 where the electric vehicle 10 is not scheduled to be used, C1 is entered to secure a minimum battery capacity, and the battery capacity is gradually increased during the time period between the clock time t1 and the clock time t2 where there is the possibility that the electric vehicle 10 starts to be used when the schedule is changed. During a time period after the clock time t2 where the electric vehicle 10 almost certainly starts to be used, C2 (determined in view of distance to drive) is entered as a battery capacity sufficient for drive.

A hatched zone in FIG. 4, which is obtained by subtracting the required capacities C1 and C2 from the entire capacity Cmax at the respective clock times, is set as a usable capacity. In the first embodiment, the usable capacity is set as the value obtained by subtracting the capacity C2 required for drive from the entire capacity Cmax. In the present embodiment, however, a far higher usable capacity can be secured before the clock time t2 at which the electric vehicle 10 stars being used.

Needless to say, FIG. 4 is only one example of input of the usable capacity. Graphs with various characteristics can be set according to the operation conditions of the electric vehicle 10. In the foregoing example, the capacity that is usable until the start of the next use is entered. However, it is also possible to enter the capacity that is usable until the electric vehicle 10 starts to be used after the next or the capacity that is usable for the next one month according to drive schedules of the electric vehicle 10 of the next one month.

The actual input by a driver is carried out using, for example, the touch-screen display 19 of the navigator (input device). More specifically, an empty graph (including only vertical and horizontal axes) similar to FIG. 4 is displayed on the display 19. The driver sequentially touches points at the intersections between the clock times when the electric vehicle 10 starts being used and the required capacities for these clock times, thus determining t1, C1, t2 and C2. The graph is made by automatically connecting the intersection points. The input of the usable capacity for each clock time, however, is not limited to this example. For example, the clock times t1 and t2 and the required capacities C1 and C2 may be entered with keys.

The usable capacity for each clock time which is set as described above is entered from the ECU 18 through the connection port 9 and the PCS 5 into the EMS 13, and passed on from the EMS 13 to the power supply/demand management center 3. The power supply/demand management center 3 sets the charge/discharge commands of the batteries 17 according to the procedure shown in FIG. 3 as with the first embodiment on the basis of the usable capacity entered by the driver with respect to each of the electric vehicles 10 in the foregoing manner.

FIG. 4 shows the charge/discharge condition of the battery 17 by a broken line. For example, when electricity supply in the smart grid is excess, the battery 17 is controlled to the charge side by the electricity consumers 2 to charge the battery 17 with excess electricity. When the electricity supply in the smart grid is deficient, the battery 17 is controlled to the discharge side to compensate the deficiency of electricity. These charge/discharge controls are implemented within a range of the usable capacity in any case.

For example, as shown between the clock times t1 and t2 in FIG. 4, when the battery capacity is deviated from a lower limit of the usable capacity (falls lower than the required capacity) during discharge, the battery capacity is controlled to the lower limit of the usable capacity. In FIG. 4, the start of use of the electric vehicle 10 is delayed from the estimated clock time t2 to t2'. Such a time lag of the drive start estimation often happens. Nonetheless, the battery capacity C2 usable for drive continues to be secured after the clock time t2, so that the drive of the vehicle can be started without problem.

The power supply and demand leveling system according to the present embodiment makes the driver enter the usable capacity of the battery 17 installed in the electric vehicle 10, which can be used to level power supply and demand on the basis of the drive schedules of the electric vehicle 10 parked at the electricity consumers 2, and applies the entered usable capacity to the setting of the charge/discharge command of the battery 17. For that reason, the batteries 17 are subjected to the charge/discharge controls within the range of the usable capacities thereof, so that the battery capacities can be profitably used to the full for equilibration of power supply and demand.

The first and second embodiments control the charge/discharge range of the battery 17 according to the usable capacity. It is also possible to take additional measures of preventing a frequent or rapid charge and discharge that might deteriorate the battery.

More specifically, an integral power limiting value for limiting an integrated value of the input/output electricity with respect to the battery 17 and a maximum power limiting value for limiting a maximum value of the input/output electricity with respect to the battery 17 are previously set. When the integrated value of the input/output electricity reaches the integrated power limiting value while the charge/discharge control is being carried out, the charge/discharge control is stopped at that point, or alternatively, the maximum value of the actual input/output electricity of the battery 17 is controlled to the maximum power limiting value. The above-described procedure prevents a frequent and rapid charge/discharge in the battery 17, and thus further reduces the charge/discharge load of the battery 17.

The integrated power limiting value and the maximum power limiting value are values specific to the batteries, the values being set to be in vicinity to an upper limit for preventing the battery 17 from being drastically deteriorated. However, if the battery 17 is already deteriorated in the process of being used, or if battery temperature is deviated from a normal service temperature range, a proper limiting value is accordingly changed. To solve this issue, the integrated power limiting value and the maximum power limiting value may be compensated according to a duration of use which is integrated during the charge/discharge of the battery 17 or the battery temperature detected by a temperature sensor 31 (shown in FIG. 2). This way, the charge/discharge control of the battery 17 can be appropriately implemented.

[Third Embodiment]

A third embodiment will be described below, in which the present invention is embodied in the form of still another power supply and demand leveling system.

The power supply and demand leveling system according to the third embodiment is identical to the system described in the first in its basic configuration, and a difference is that not only the electric vehicles 10 parked at the electricity consumers 2 but also the electric vehicles 10 that are moving are considered. In other words, even if the electric vehicle 10 is moving and therefore unusable for equilibration of power supply and demand, as long as an estimated arrival time to the electricity consumer 2, namely, a destination, is known, it can be prepared to secure an extra usable capacity of the battery 17 by the estimated arrival time. By setting present charge/discharge commands for the batteries 17 on the premise that the usable capacity of the battery 17 is increased at the electricity consumer 2 at the estimated arrival time, the charge/discharge control of the batteries 17 can be further properly implemented. The following description focuses on this procedure.

A mobile communication system is installed in the electric vehicle 10 so that telematics service is available. As shown in FIG. 1, even if the electric vehicle 10 is moving, it is possible to communicate with the power supply/demand management center 3 by using a mobile communication service.

In order that the electricity consumer 2 may expect to have the usable capacity of the battery 17 reflecting the battery capacity of the electric vehicle 10 that is moving, it is necessary to find the estimated arrival time of the electric vehicle 10 to the electricity consumer 2 and the usable capacity of the battery 17. Furthermore, it is desirable that a remaining capacity of the battery 17 at the time of arrival be predicted.

For example, by means of the touch-screen display 19 of the navigator, the driver enters various pieces of information including the electricity consumer 2 as a destination, an estimated arrival time, a drive route from a current position to the electricity consumer 2, etc. The ECU 18 determines the estimated arrival time to the electricity consumer 2 on the basis of the entered information, and calculates a predicted remaining capacity of the battery 17 at the time of arrival at the electricity consumer 2 on the basis of a drive distance obtained from a current remaining capacity of the battery 17 and the drive route to the electricity consumer 2. The power consumption of the battery 17 is affected by not only the drive distance but also the acceleration/deceleration frequency of the vehicle and unevenness of a road surface. In this light, the predicted remaining capacity of the battery 17 may be compensated according to traffic jam information obtained from a vehicle information-and-communication system (VICS) or road information obtained from a navigation system.

After the estimated arrival time to the electricity consumer 2 and the predicted remaining capacity of the battery 17 are calculated as described above, the ECU 18 transmits the information and the usable capacity of the installed battery 17 to the power supply/demand management center 3 via the mobile communication system. Accuracy in calculating the predicted remaining capacity of the battery 17 is more increased as the vehicle gets closer to the destination. For this reason, the predicted remaining capacity may be calculated and renewed on the basis of a current position obtained by the navigation system and a current battery remaining capacity for each predetermined clock time, and sequentially transmitted to the power supply/demand management center 3.

In the power supply/demand management center 3, on the basis of the information transmitted from the moving electric vehicle 10, it can be expected that the battery capacity of the electric vehicle 10 may be secured in the electricity consumer 2 by the estimated arrival time of the electric vehicle 10.

More specifically, if the predicted remaining capacity of the battery 17 is in the usable area, it can be considered that an extra battery capacity that is available for both charge and discharge within a usable capacity at the estimated arrival time can be secured. If the predicted remaining capacity of the battery 17 is lower than the lower limit of the usable area, it can be considered that the extra battery capacity that is available only for charge (for both charge and discharge after the charge is finished) at the estimated arrival time can be secured.

For example, if it is known that the electric vehicle 10 having an extremely low remaining capacity in the battery 17 will arrive at the electricity consumer 2 in a short time, on the basis of the estimated arrival time and the predicted remaining capacity, even if the batteries 17 of the electricity vehicles 10 being parked are scheduled to be charged with excess electricity at the time point, the charge waits until the moving electric vehicle 10 arrives. After the arrival of the electric vehicle 10, the battery 17 of the electric vehicle 10 is charged in precedence to the batteries 17 of the other electric vehicles 10.

It is consequently possible to not only prevent the excess of the electricity supply but also finish the charge of the battery 17 of the electric vehicle 10 immediately. It is therefore also possible to use the electric vehicle 10 sooner and to immediately bring the battery 17 into a condition where both charge and discharge are available for equilibration of power supply and demand. Needless to say, the above aspect is one example, and the battery charge/discharge control may be optimized by setting other various charge/discharge commands.

As far as the information to be transmitted from the electric vehicle 10 to the power supply/demand management center 3 is concerned, the predicted remaining capacity of the battery 17 is not always necessary. The information to be transmitted may be the estimated arrival time to the electricity consumer 2 and the usable capacity of the battery 17 only.

As described above, in the power supply and demand leveling system according to the present embodiment, the estimated arrival time to the electricity consumer 2 as a destination, the predicted remaining capacity of the battery 17 at the arrival time, and the usable capacity of the battery 17 are transmitted from the moving electric vehicle 10 to the power supply/demand management center 3. In the power supply/demand management center 3, it is expected that the battery capacity of the electric vehicle 10 may be secured at the estimated arrival time of the electric vehicle 10 at the electricity consumer 2, and the present charge/discharge commands of the batteries 17 can be set on that premise. As a consequence, the charge/discharge controls of the batteries 17 can be further appropriately carried out to level power supply and demand.

This is the end of the descriptions of the embodiments. However, the aspect of the invention is not limited to the foregoing embodiments. For example, the embodiments obtain the required charge/discharge amounts of all the batteries 17, which are necessary to prevent the fluctuation of the power supply and demand of the electricity consumers 2 as a whole, on the basis of the result of comparison of the total power supply/demand condition of the electricity consumers 2 as a whole with the total usable capacity of all the batteries 17. However, it is not always necessary to calculate the required charge/discharge amounts of all the batteries 17. For example, the charge/discharge commands of the batteries may be set on the basis of the individual power supply/demand condition of the electricity consumers 2, the total power supply/demand condition of the entire electricity consumers 2, the individual usable capacity of the batteries 17, and the total usable capacity of the entire batteries 17.

Furthermore, the electric vehicle of the present invention is not limited to the electric vehicle 10 described in the embodiments, and may be a plug-in hybrid vehicle.

REFERENCE MARKS

1 Electricity utility
2 Electricity consumer
3a Electricity supply/demand condition judging section (power supply/demand condition judging device)
3c Battery capacity judging section (battery capacity judging device)
3d Charge/discharge command setting section (charge/discharge command setting device)
4 Distribution line
10 Electric vehicle
13 EMS (charge/discharge controller)
17 Battery
19 Touch-screen display (input device)

The invention claimed is:

1. A power supply and demand leveling system, comprising:
    a plurality of electricity consumers supplied with electricity from electricity utilities through distribution lines, and whose electric vehicles are arbitrarily parked and connected to the distribution lines;
    a power supply/demand condition judging device into which power supply/demand conditions of the electricity consumers are individually entered, and which judges from the entered information a total power supply/demand condition of the electricity consumers as a whole;
    a battery capacity judging device into which capacities of batteries installed in the electric vehicles being parked, which will be usable after the batteries are charged/discharged, are individually entered from the electricity consumers, and which judges a total usable capacity from the entered information;
    a charge/discharge command setting device into which an individual power supply/demand condition of the electricity consumers and a total power supply/demand condition of the electricity consumers as a whole are entered from the power supply/demand condition judging device, into which an individual usable capacity of the batteries and a total usable capacity of all the batteries are entered from the battery capacity judging device, sets charge/discharge commands required to prevent a fluctuation in power supply and demand of the electricity consumers as a whole and an imbalance of power supply and demand between the electricity consumers and level power supply and demand, with respect to the batteries of the electric vehicles on the above information, and outputs the preset charge/discharge commands to the respective electricity consumers; and
    a charge/discharge controller that is provided to each of the electricity consumers and implements charge/discharge controls on the batteries according to the charge/discharge commands entered from the charge/discharge command setting device,
    wherein a usable capacity of a battery entered from an electricity consumer is determined based on a difference between a maximum capacity of the battery and a capacity required to drive the electric vehicle as desired by a user.

2. The power supply and demand leveling system according to claim 1, wherein
    the electricity consumers have an input device for entering a plurality of clock times after the electric vehicles are connected to the distribution lines, and also entering as the usable capacity a capacity allowing charge and discharge for equilibration of power supply and demand among the capacities of the batteries installed in the electric vehicles at each of the clock times, on the basis of drive schedules of the parked electric vehicles, and the usable capacity entered by means of the input device is outputted to the battery capacity judging device; and
    the battery capacity judging device judges a total usable capacity of all the batteries on the basis of the usable capacities entered from the electricity consumers.

3. The power supply and demand leveling system according to claim 1, wherein
    the battery capacity judging device receives the usable capacities of the batteries individually not only from the electric vehicles parked at the electricity consumers but also from moving electric vehicles, and also receives estimated arrival times to the electricity consumers, namely, destinations, individually; and
    on the premise that the usable capacities of batteries of the electric vehicles are secured at the electric consumers at the estimated arrival times of the moving electric vehicles to the electricity consumers, a charge/discharge command setting device sets a present charge/discharge command of each battery.

4. The power supply and demand leveling system according to claim 2, wherein
    the battery capacity judging device receives the usable capacities of the batteries individually not only from the electric vehicles parked at the electricity consumers but also from moving electric vehicles, and also receives estimated arrival times to the electricity consumers, namely, destinations, individually; and on the premise that the usable capacities of batteries of the electric vehicles are secured at the electric consumers at the estimated arrival times of the moving electric vehicles to the electricity consumers, a charge/discharge command setting device sets a present charge/discharge command of each battery.

5. The power supply and demand leveling system according to claim 1, wherein the charge/discharge command setting device sets the charge/discharge command so that the batteries with a high usable capacity are provided with a larger charge/discharge amount than the batteries with a low usable capacity, in order to equalize a charge/discharge load of each of the batteries.

* * * * *